(12) United States Patent
Hayakawa

(10) Patent No.: US 7,542,107 B2
(45) Date of Patent: Jun. 2, 2009

(54) METHOD OF LETTING A SUFFICIENT QUANTITY OF LIGHT PASS THROUGH EACH OF APERTURES FOR ENTRY OF BACKLIGHT

(75) Inventor: Takashi Hayakawa, Tokyo (JP)

(73) Assignee: Miyakawa Corporation, Tokyo (JP)

( * ) Notice: Subject to any disclaimer, the term of this patent is extended or adjusted under 35 U.S.C. 154(b) by 660 days.

(21) Appl. No.: 11/253,555

(22) Filed: Oct. 20, 2005

(65) Prior Publication Data

US 2007/0013830 A1    Jan. 18, 2007

(30) Foreign Application Priority Data

Jul. 12, 2005    (JP) .............................. 2005-203325

(51) Int. Cl.
    *G02F 1/1335*    (2006.01)
(52) U.S. Cl. .............................. 349/62; 349/61; 349/64
(58) Field of Classification Search .................. 349/62, 349/64
    See application file for complete search history.

(56) References Cited

U.S. PATENT DOCUMENTS 7,163,293 B2 *    1/2007    Kim et al. ..................... 353/31

FOREIGN PATENT DOCUMENTS

| JP | 05-303017   | 11/1993 |
|----|-------------|---------|
| JP | 2000-180605 | 6/2000  |
| JP | 2004-117955 | 4/2004  |
| JP | 2004-240294 | 8/2004  |

\* cited by examiner

*Primary Examiner*—David Nelms
*Assistant Examiner*—Phu Vu
(74) *Attorney, Agent, or Firm*—Young & Thompson

(57) ABSTRACT

A liquid crystal display (LCD) panel has apertures for entry of backlight. A micro-lens array comprises micro-lenses of a resin on a transparent base. The base and each of the micro-lenses have a surface energy difference falling in or constrained to a predetermined range. The shape of each of the micro-lenses is such that collimated light substantially orthogonally incident to each of the micro-lens is compressed into a tight beam to enter one of the apertures.

19 Claims, 7 Drawing Sheets

FIG. 1
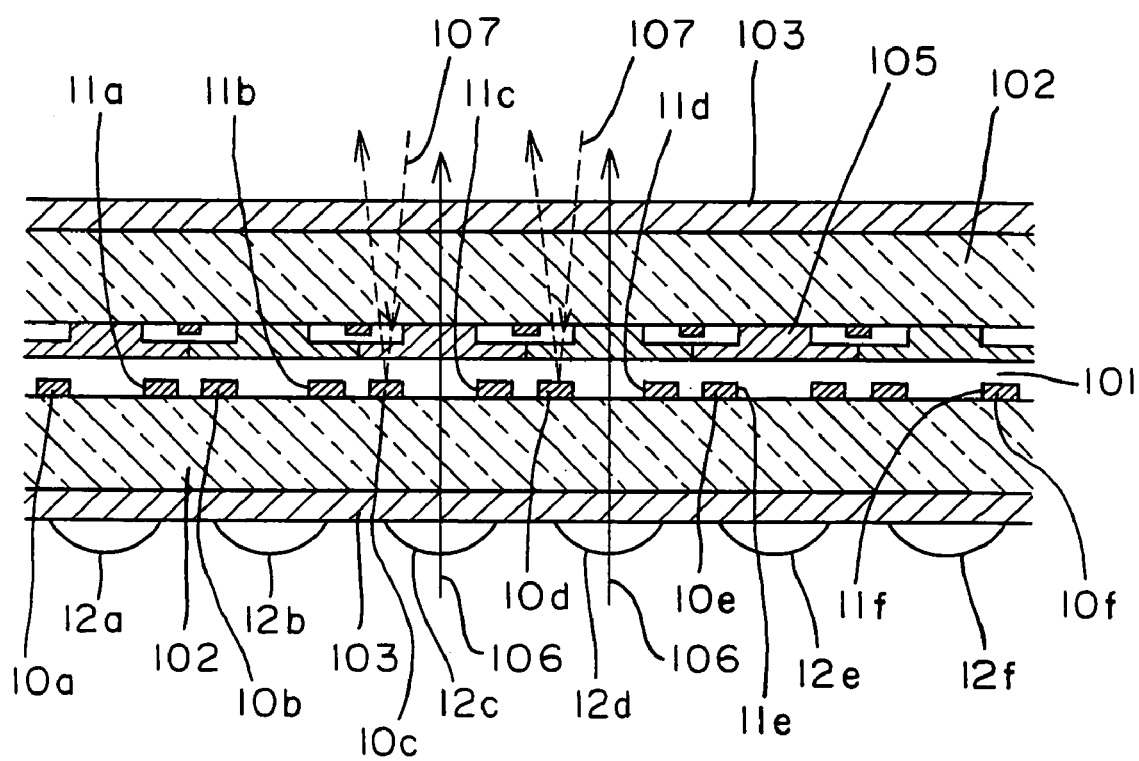
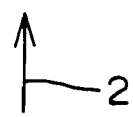

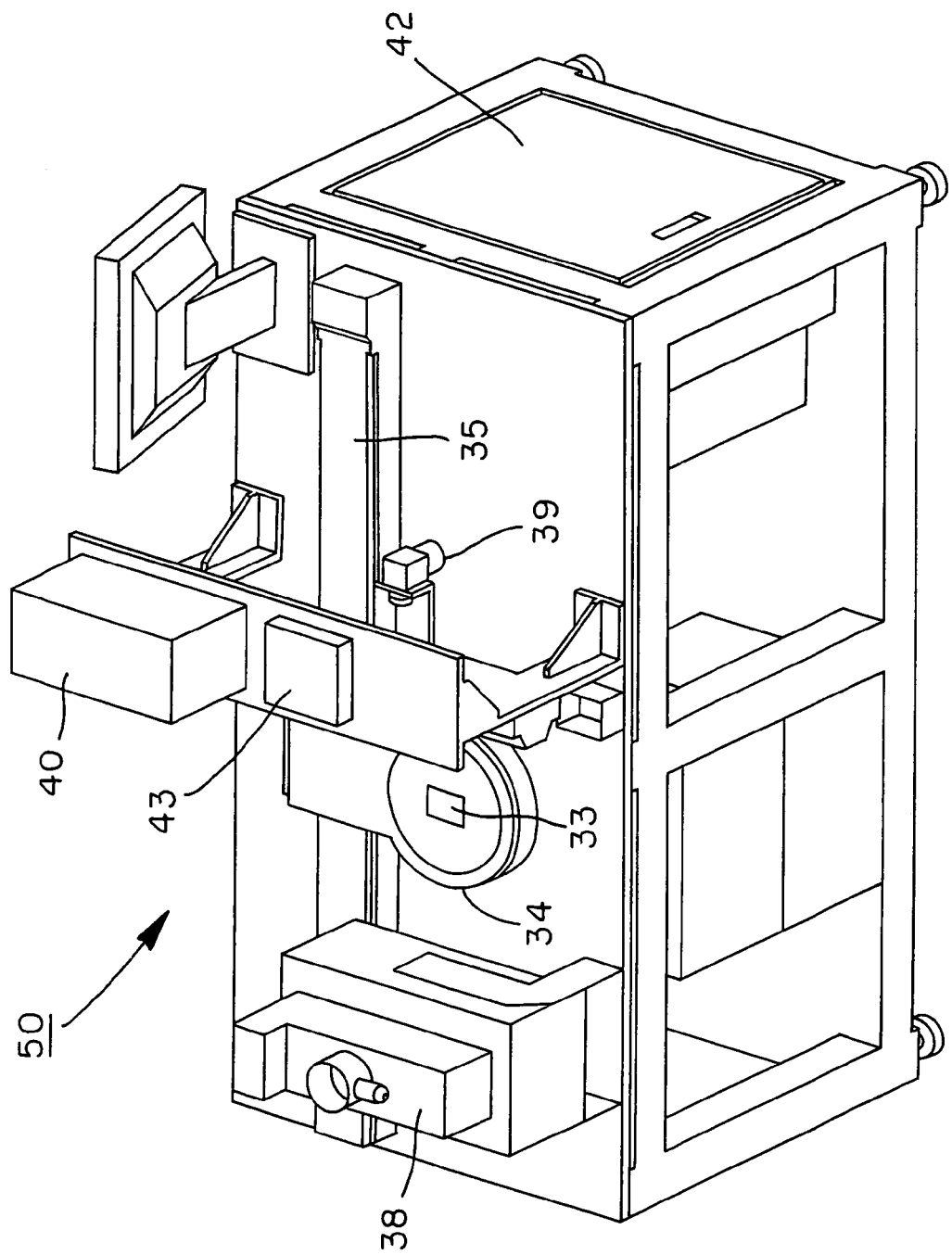

METHOD OF LETTING A SUFFICIENT QUANTITY OF LIGHT PASS THROUGH EACH OF APERTURES FOR ENTRY OF BACKLIGHT

FIELD OF THE INVENTION

The present invention relates to a method of letting a sufficient quantity of light pass through each of apertures for entry of backlight.

BACKGROUND OF THE INVENTION

Transflective liquid crystal display (LCD) devices use the reflected brightness from natural room light or sunlight and the transmitted brightness from a backlight. In the transflective LCD devices, each pixel has a reflective region and a transmissive region. The natural light incident to the reflective region is reflected by a reflector. The reflected light enters the reflective region. The reflector has an aperture for allowing backlight to enter the transmissive region. The backlight incident to each pixel is blocked by the reflector except a portion of the backlight entering the aperture. Increasing area of the aperture of the reflector provides increased efficiency, for which the backlight enters the aperture, thereby providing increased brightness of each pixel. However, a significant increase in the area of the aperture to a satisfactory level is impossible. A power increase in backlight source and/or an efficient light transmission have been proposed to let a sufficient quantity of light pass through the aperture of the reflector to increase the brightness to a satisfactory level. Various known proposals of this kind are not satisfactory because they demand modification on the existing LCD panels and/or investment to increase adaptability to various specifications of the existing LCD panels.

A need remains for an improved light transmission that may be implemented in various existing LCD panels without any modification on the existing constituent elements of the LCD panels.

SUMMARY OF THE INVENTION

According to one aspect of the present invention, there is provided a micro-lens array for a liquid crystal display (LCD) panel having apertures for entry of backlight, the micro-lens array comprising:

a transparent base; and micro-lenses of a resin on the base, the base and each of the micro-lenses having a surface energy difference falling in a predetermined range, wherein the shape of each of the micro-lenses is such that collimated light substantially orthogonally incident to each of the micro-lens is compressed into a tight beam to enter one of the apertures.

According to another aspect of the present invention, there is provided a method of letting a sufficient quantity of light pass through each of apertures for entry of backlight to liquid crystal (LC) of a liquid crystal display (LCD) panel, the method comprising:

utilizing an inkjet head to deposit droplets of a liquid resin composition on a transparent base in alignment with the apertures;

constraining a surface energy difference between each of the droplet and the base to a predetermined range:

utilizing the surface energy difference to let the droplets grow into micro-lenses having a shape;

curing the micro-lenses to keep the shape such that collimated light substantially orthogonally incident to each of the micro-lenses is compressed into a tight beam to enter one of the apertures; and exposing the base bearing the micro-lenses to backlight.

According to still another aspect of the present invention, there is provided a system for letting a sufficient quantity of light pass through each of apertures for entry of backlight to liquid crystal (LC) of a liquid crystal display (LCD) panel, the system comprising:

an inkjet head configured to deposit droplets of a liquid resin composition on a transparent base in alignment with the apertures;

means for utilizing a surface energy difference constrained to a predetermined range to let the droplets grow into micro-lenses having a shape;

an unit configured to cure the micro-lenses to keep the shape such that collimated light substantially orthogonally incident to each of the micro-lenses is compressed into a tight beam to enter one of the apertures; and means for exposing the base bearing the micro-lenses to backlight.

According to a further aspect of the present invention, there is provided a micro-lens fabrication apparatus, comprising:

a liquid crystal display (LCD) panel having apertures for entry of backlight and a transparent base, the apertures being arranged in rows and in columns;

a holder on which the LCD panel is placed with the transparent base up;

a camera configured to pick up image of the apertures;

means for processing the picked up image of the apertures to determine a rotary angle through which the LCD panel should rotate to come to an accurately oriented position in which the columns of the apertures extend in the x direction and providing a control signal indicative of the determined rotary angle;

means for rotating the holder and the LCD panel through the determined rotary angle to the accurately oriented position in response to the control signal indicative of the determined rotary angle;

an inkjet head having a plurality of nozzles, the inkjet head having a home position and various inclined position;

a tank containing liquid resin composition;

means for bringing the inkjet head to a selected one of the various inclined position in which the plurality of nozzles are in alignment with at least some of the columns of the apertures, respectively;

means for moving the LCD panel in the x direction;

an inkjet controller configured to control discharge of the liquid resin composition via the nozzles to deposit droplets of the liquid resin composition on the transparent base, each in alignment with one of the apertures; and means for curing the deposited droplets to make micro-lenses.

BRIEF DESCRIPTION OF THE DRAWINGS

The invention is further explained with reference to the accompanying drawings. In the drawings:

FIG. 1 is a schematic cross section of a portion of a transflective LCD panel, showing one embodiment of the present invention.

FIG. 8 is a rear perspective view of the micro-lens fabrication apparatus shown in FIG. 7.

DETAILED DESCRIPTION OF THE INVENTION

Figure 2:
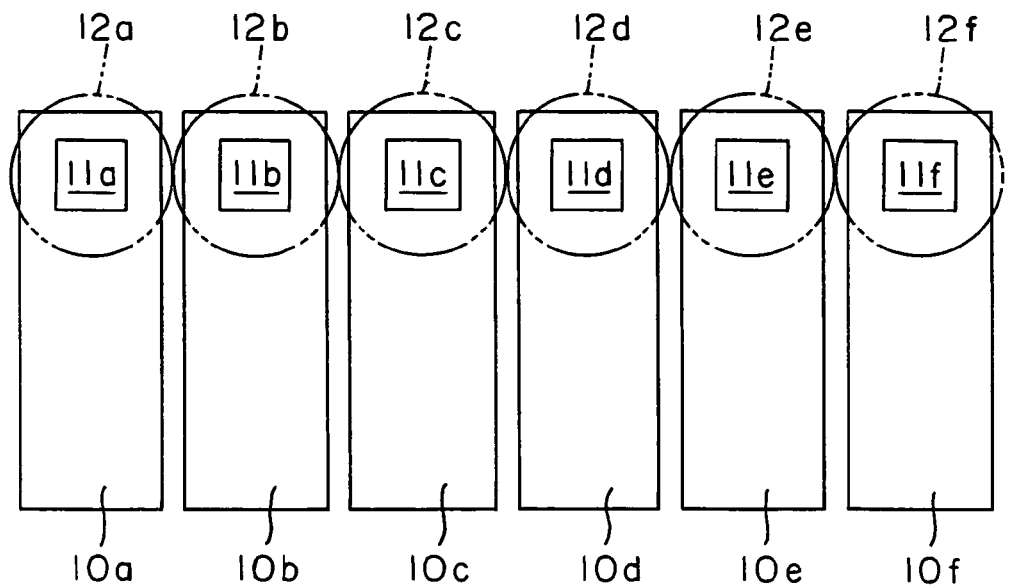
FIG. 2 is a schematic bottom plan view viewing FIG. 1 in the direction of an arrow 2, with the micro-lenses excessively enlarged in diameter into contact with each other.

Referring to FIG. 1, a transflective LCD panel includes a liquid crystal (LC) layer 101 between two sheets of glass 102 and 102. At an outer face, each of the sheets of glass 102 bears or is covered by a polarizer film 103. As is well known, the LCD panel includes a great number of pixels. In FIG. 1, six pixels belonging to the same row are shown, each including a reflector 10a, 10b, 10c, 10d, 10e, 10f and a color filter represented ay 105. Referring also to FIG. 2, the reflectors 10a to 10f are formed with rectangular apertures 11a, 11b, 11c, 11d, 11e and 11f for entry of backlight. In FIG. 1, the fully drawn arrows 106 represent backlight, while the broken line drawn arrows 107 represent natural room or sunlight. When both reflective and transmissive modes are used simultaneously, a difference, if any, in optical path would make it difficult to optimize the output, such as brightness and contrast. In order to eliminate the difference in optical path the thickness of the color filter 105 and the thickness of LC layer are one half in reflective region of each pixel as much as those in transmissive region. The thickness of each reflector is one half as much as a distance between the color filter 105 and the inner face of the sheet of glass 102.

As shown in FIG. 1, in the embodiment, micro-lenses of a resin 12a, 12b, 12c 12d and 12f are formed on a transparent base, in the form of polarizer film 103 or an optical film, in alignment with the apertures 11a, 11b, 11c, 11d, 11e and 11f, respectively. The shape of each of the micro-lenses 12a to 12f is such that collimated light substantially orthogonally incident to each of the micro-lens is compressed into a tight beam to enter one of the apertures 11a to 11f.

As clearly illustrated in FIG. 2, the apertures 11a to 11f of the pixels of the same row belong to the same row. The LCD panel uses this aperture arrangement, enlargement of the diameter of each of micro-lenses is limited by the adjacent micro-lenses for the pixels belonging to the same row.

Figure 3:
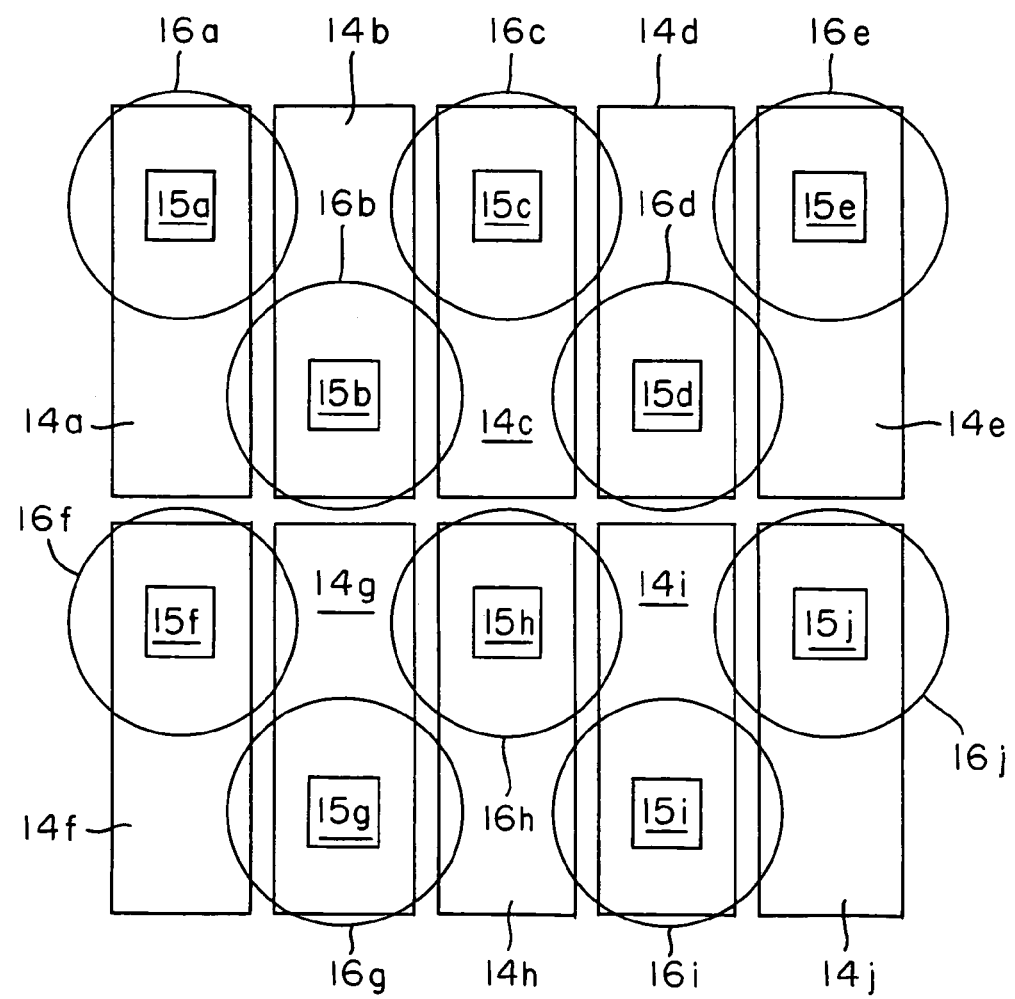
FIG. 3 is a schematic bottom plan view of a LCD panel having aperture for entry of backlight arranged in rows and in columns such that such that the two of the apertures which belong to the adjacent two of the columns belong to the adjacent two of the rows, respectively, showing another embodiment of the present invention.

To alleviate this problem, another embodiment shown in FIG. 3 has chosen a so-called zigzag arrangement of apertures 15a to 15j. In other words, the apertures 15a to 15j are arranged in four rows and in five columns such that the two of the apertures 15a to 15j which belong to the adjacent two of the columns belong to the adjacent two of the rows, respectively. Naturally, the micro-lenses 16a to 16j formed in alignment with the apertures are arranged in rows and in columns such that the two of the micro-lenses 16a to 16j which belong to the adjacent two of the columns belong to the adjacent two of the rows, respectively. This arrangement is advantageous over the previous arrangement described in connection with FIGS. 1 and 2 in that the micro-lenses of greater width may be formed on the transparent base in the form of a polarizer film or an optical film.

FIG. 3 illustrates reflectors 14a to 14j for 10 pixels arranged in two rows and five columns. The maximum diameter of each of the micro-lenses may be expressed as one half of a distance between two apertures of the adjacent two reflectors, for example, 14b and 14c. At least 15 microns is need as a clearance between the adjacent two micro-lenses 16g and 16h, for example, a need arises to form a micro-lens having substantially large curvature in order to provide an arrangement in which collimated light substantially orthogonally incident to each of the micro-lenses is focused at a point after having past through the thickness of the polarizer film and that of the sheet of glass.

The preferred index of refraction of transparent thermosetting or photosetting liquid resin composition is preferably between 1.30 and 1.70 after the resin composition has been cured. Appropriate selection of the index of refraction within the above mentioned range is needed to create a micro-lens having a sufficiently long distance to a focus. Adjustment of curvature of a micro-lens may be made by varying a surface energy difference between the micro-lens and the base. In the embodiments, a surface energy difference falling in or constraint to a predetermined range from 5 dyne/cm$^2$ to 20 dyne/cm$^2$ is used. This range is preferred.

Preferred materials for a transparent base include triacetlyl cellulose (TAC) which is used as a base material for the existing polarization film and optical film of liquid crystal display (LCD) devices. The transparent base has a surface energy. Surface energy of the transparent base may be varied by surface coating. Preferred surface coating includes oil and water-repellant coating using fluorinate or silicon coating liquid.

Preferred transparent thermosetting or photosetting liquid epoxy or acrylic resin compositions for micro-lenses include a UV-curable resin composition. The UV-curable resin composition contains, as one essential component, at least one class of epoxy resins selected from vinyl ether resins, alicyclic epoxy resins, flocculus aliphatic epoxy resins, fluorinated epoxy resins, brominized epoxy resins, sulfur containing epoxy resins, and oxetane monomers. It may contain one epoxy resin or a plurality of epoxy resins in a mixture. However, the mixture is preferable to take for adjustment of an index of refraction to provide a UV-curable resin composition having a desired index of refraction.

Suitable classes of vinyl ether resins include 2-hydroxyethyl vinyl ether, 4-hydroxybutyl vinyl ether, diethylene-glycol mono-vinyl ether, and 14-cyclohexane dimethanol divinyl ether.

Suitable classes of alicyclic epoxy resins include 3,4-eploxycyclohexyl methyl-3,4-epoxycyclohexane carboxylate, 3,4-epoxycyclohexyl ethyl-3,4-epoxy cyclohexane carboxylate, vinylcyclohexene dioxide, and allyl cyclohexene dioxide. Suitable classes of fluorinated epoxy resins include known epoxy resins.

Suitable classes of brominized epoxy resins include dibromo methylphenyl glycidyl ether, dibromo phenyl glycidyl ether, bromomethyl phenyl glycidyl ether, buromo phenyl glycidyl ether, dibromo metaclecidyl ether, dibromoneopentylglycol diglycidyl ether, and brominized phenol novolak epoxy resin. Suitable classes of sulfur containing epoxy resins include bis 4-(2,3-epoxy propylthio) phenyl sulfide.

The acrylic resin compositions include well known compounds called reactant oligomer or prepolymer, which is mixed with acrylate compound and has at least one carbon-carbon duplex association in intramolecular. Suitable classes of such compounds maleic anhydride, propylene glycol, oligo ester (meta) acrylate, epoxy (meta) acrylate, polyethylene glycosyl (meta) acrylate, and urethane (meta) acrylate.

For use in LCD devices, the most commonly used plastic sheet polarizers are composed of a thin, unaxially stretched polyvinyl alcohol (PVA) film, which aligns the PVA polymer chains in a more-or-less parallel fashion. To mechanically support the fragile PVA film, it is then laminated on both sides with stiff layers of triacetyl cellulose (TAC). Glass sheets and polarizer films used in several examples of the conventional LCD devices available in the market were measured. The polarizer films have a thickness of 100 microns, and the glass sheets have a thickness between 400 microns and 500 microns. Using the ink-jet process, micro-lenses of 15 different diameters were formed on polarizer films of the above kind, respectively. It was confirmed that all of the micro-lenses had the same curvature.

Using the ink-jet process, micro-lenses were continuously formed on a first face of a polarizer film of the above kind. They have a height in the z-direction of 10 microns and a diameter of approximately 150 microns in the x-y plane. The shape of each of these micro-lenses was measured using "Violet laser color 3D profile microscope" manufactured by Keyence Co., Ltd, Japan. The data was used as an input to a light measurement tool called "LightTools" (Registered Trade Mark) supplied by Cybernet Systems Co., Ltd.

Simulation was conducted using collimated light substantially orthogonally incident to each of the micro-lenses, which were formed on the first face of the polarizer film. Each of the micro-lenses having a height in the direction of 10 microns and a diameter of 150 microns in the x-y plane was made of a resin having an index of refraction of between 1.30 and 1.70. The polarizer film having a thickness of 100 microns was used. A sheet of glass having a thickness of 500 microns was on a second face of the polarizer film. The polarizer film was composed of a polyvinyl alcohol (PVA) film having an index of refraction of 1.51 (of between 1.49 and 1.53) and triacetyl cellulose (TAC) having an index of refraction of 1.474. The sheet of glass was alkaliless glass having an index of refraction of 1.52.

Figure 4:
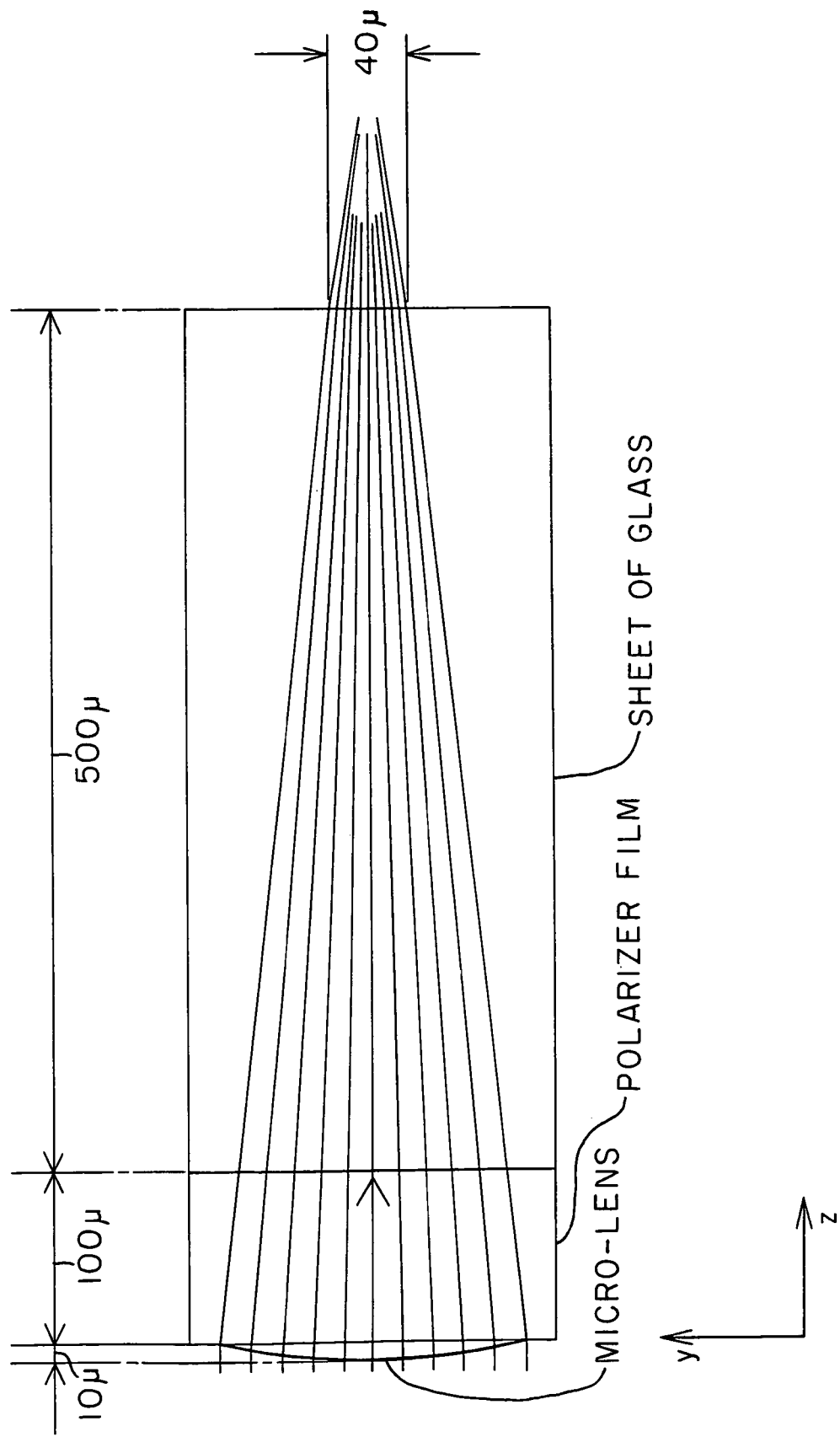
FIG. 4 is a schematic view illustrating the result of simulation that collimated light substantially orthogonally incident to one micro-lens is compressed into a tight beam to enter an aperture.

FIG. 4 illustrates the simulation result, which showed that the collimated light incident to each of the micro-lenses was compressed into a tight beam to enter an aperture distant in the z-direction by 600 microns from the first face of the polarizer film. The collimated incident light was focused at a point distant in the z-direction by more than 600 microns. The tight beam leaving the sheet of glass to enter the aperture had a diameter of 40 microns in the x-y plane. The aperture was a square aperture having four sides each having a length of 40 microns in the x-y plane.

A transflective LCD with micro-lenses (10 microns height and 150 microns diameter) from above (invention) and a prior transflective LCD device without micro-lenses, both having a reflector layer with apertures covering an exit face of a sheet of glass (500 microns thick) on a polarizer film (100 microns thick), were measured for maximum luminance at an exit face of the reflector layer, total luminous flux at the exist face of the reflector layer, and mean luminance at the exit face of the reflector layer.

The measured values for the invention and prior art are listed in Table 1 below.

TABLE 1

|  | Invention (Micro-lenses) | Control (Prior Art) | Invention/Prior Art |
| --- | --- | --- | --- |
| Maximum luminance | 165512832 cd/m$^2$ | 10496930 cd/m$^2$ | 15.76 |
| Total luminous flux | 0.55805 Lm | 0.05111 Lm | 10.92 |
| Mean luminance | 133753714 cd/m$^2$ | 5488203 cd/m$^2$ | 24.37 |

As the data above clearly indicates, micro-lenses formed on a polarizer film provide excellent light transmission allowing for brighter LCD devices. The total luminous flux of the invention is about 10.9 times as high as the prior art. The mean luminance of the invention is about 24.4 times as high as the prior art.

Image Processing to Calculate Positions, at Each of which Discharge is to Occur:

For forming micro-lenses on a base such as a polarizer film or an optical film, image processing is carried out to determine positions on the base so that a calibrated amount of resin composition may be discharged at each of the determined positions. As the micro-lenses are to be formed on the base in alignment with apertures of a reflector, respectively, a need remains for on-line detection of the apertures to determine the positions on the base. Detection of the apertures after placing a zero point on a contour of a LCD panel is not acceptable due to rough accuracy with which a LCD panel is cut out of a sheet of glass. Accordingly, the image processing is strongly recommended for detection of the apertures and for determination of a current angular position of a LCD. After letting a face of a polarizer film of the LCD extend in the x-y plane with good accuracy, a need remains for detecting a plurality of apertures to determine the current angular position of the LCD within the x-y plane.

Because a liquid crystal (LC) is opaque when current is not passing therethrough, the apertures are detected by using a source of concentric vertical injection light because a transmission beam cannot be used. As specifications of a LCD clearly indicate a number of apertures and their horizontal and vertical pitches, this data is advantageously used to establish algorithm and image processing conditions. The algorithm and image processing conditions are used to determine a rotary angle through which the LCD is to turn to come into an accurately oriented position in which all of the apertures in each of columns are in alignment with a line extending in the x direction, and also to express the accurately oriented position in terms of x-coordinates and y-coordinates. The established algorithm and image processing conditions are fed, as instructions, to a control device 42 (see FIG. 8).

Figure 5:
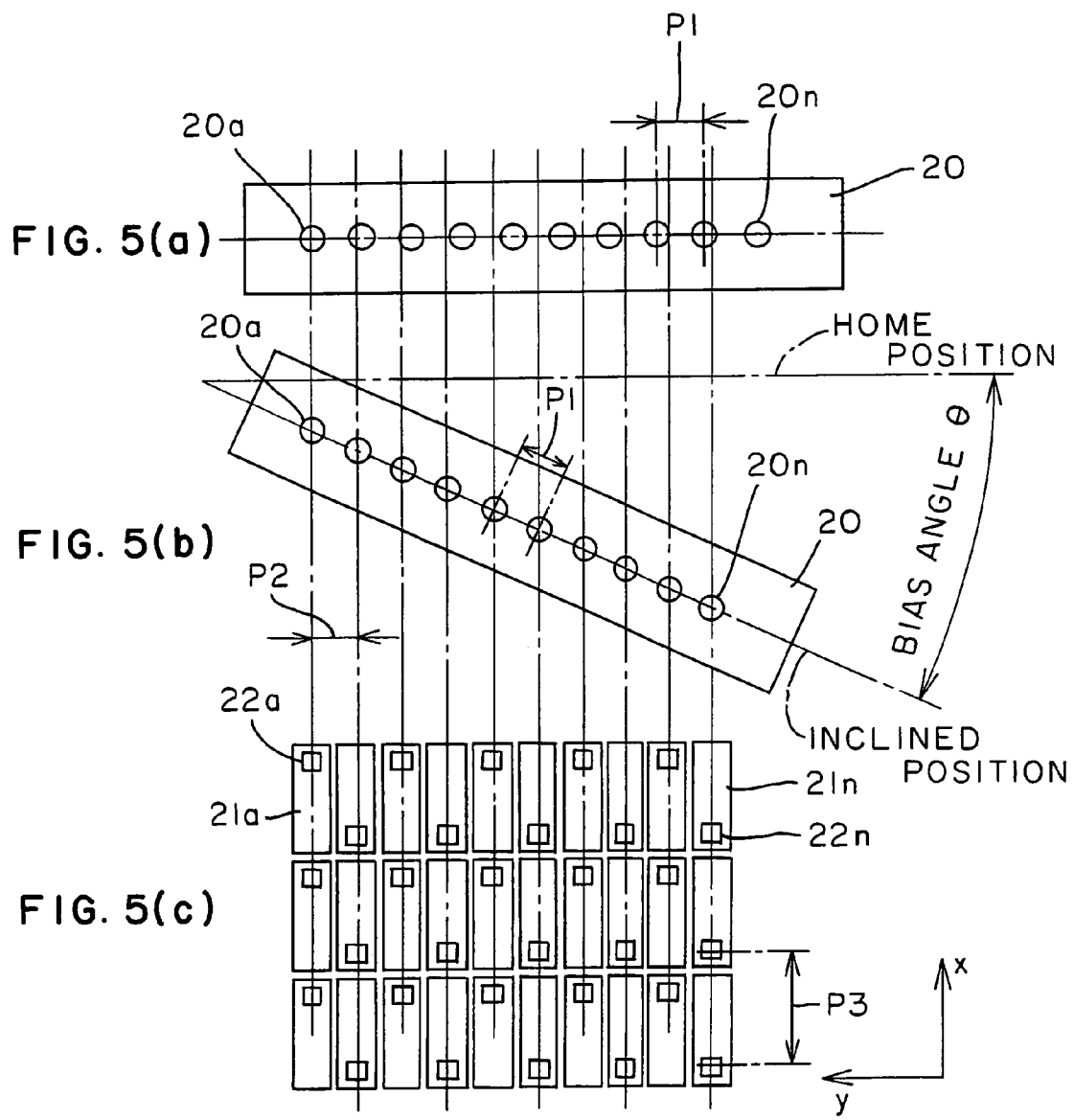
FIG. 5(a) is a schematic view of an inkjet head.
FIG. 5(b) is a schematic view of an inkjet head having a home position and various inclined positions, showing the inkjet head in one selected inclined position in which its nozzles are in alignment with columns of apertures, as illustrated in FIG. 5(c), respectively.
FIG. 5(c) is a schematic bottom plan view of a portion of a LCD display in an accurately oriented position in which 10 columns of apertures extends in the x direction.

Generation of the Optimum Data Governing Discharge:

FIG. 5(*a*) is a schematic view of an inkjet head 20 of an inkjet printer. In the illustration, the inkjet head 20 has ten equidistant nozzles 20*a* to 20*n*, each provided for inkjet process at each of positions above and in alignment with apertures in one of ten columns. The nozzles 20*a* to 20*n* have a nozzle pitch P1, i.e., a distance between centers of the adjacent two nozzles. In fact, an inkjet head having 150 nozzles per inch, 150 DPI (Dot Per Inch), was used. LCD panels of different kinds may vary in a lateral aperture pitch P2, i.e., a distance in the y-direction between the centers of the adjacent two apertures of the adjacent two pixels in the same row. The inkjet head 20 as illustrated in FIG. 5(a) can adapt itself to LCD panels of one kind having a lateral aperture pitch corresponding to the nozzle pitch P1, but it cannot adapt itself to LCD panels of another kind, see FIG. 5(b), having a lateral aperture pitch P2 less than the nozzle pitch P1.

In order to increase the adaptability of the inkjet head to varying of lateral aperture pitch with different kinds of LCD panel, an inkjet head 20 of an inkjet printer has been improved such that the inkjet head 20 can move in an orbit within x-y plane from a home position where its nozzles 20a to 20n are arranged in a line parallel to the y-axis to various inclined positions continuously. In each of the inclined positions, an extension of the line, in which the nozzles 20a to 20n are arranged, and the y-axis form between them an angle θ, namely, a bias angle θ. FIGS. 5(b) and 5(c) clearly indicate that the inkjet head 20 can adjust itself to the illustrated pattern of apertures 22a to 22n in FIG. 5(c) by moving the inkjet head 20 in the orbit to the illustrated inclined position in FIG. 5(b) where P1·cos θ comes into P2. Once the aperture lateral pitch P2 is given, the bias angle θ can be calculated and an orbit angle ψ, through which the inkjet head 20 may move in the orbit until it takes the inclined position to establish the calculated bias angle θ, can be calculated. The calculated orbit angle ψ is fed, as input data, to the control device 42 (see FIG. 8). Referring to FIG. 5(b), in the illustrated inclined position of the inkjet head 20, the nozzles 20a to 20n meet with the LCD panel moving in the x-direction before it reaches the home position of the inkjet head. This clearly indicates that the nozzles 20a to 20n of the inkjet head 20 in the illustrated inclined position are at advanced positions before the home position with respect to the movement of the LCD panel in the x-direction toward the home position. An amount of advance of each of the nozzles 20a to 20n from the home position can be calculated based on the nozzle pitch P1 and the bias angle θ. The calculated amounts of advance of all of the nozzles 20a to 20n of the inkjet head 20 in the inclined position are fed, as input data, to the controller.

After turning the LCD panel through the determined rotary angle, the LCD panel takes the accurately oriented position. As the aperture lateral pitch P2 is given by the specifications of the LCD panel and the nozzle pitch P1 is predetermined, the bias angle θ is calculated. The inkjet head 20 moves in the orbit through the orbit angle ψ until the inkjet head 20 takes the inclined position angularly displaced from the home position through the bias angle θ. After having taken the inclined position, the inkjet head 20 is adjusted in the y-direction until each of the nozzles come into alignment with the apertures, as represented at 22a, in one of the columns. After this relationship has been established, the LCD panel is moved in the x direction toward the inkjet head 20. Under algorithm governing discharge in timing and amount, each of the nozzles can deposit on the surface of a polarizer film or an optical film an appropriate amount of the resin composition liquid to the size of one of the apertures 22a to 22n.

Position Control with Micro Actuators:

The preceding description clearly indicates that a need remains for position control of a LCD panel after detecting positions of apertures and a need remains for position control of an inkjet head to an inclined position from a home position by a bias angle θ. Because the apertures are rectangular or circular and have a width of between 30 microns and 50 microns in the x and y directions, mechanisms are needed to perform very accurate position control in the above-mentioned two cases. After establishing the bias angle θ, the LCD panel needs to be sent for creation of micro-lenses thereon. A need also remains for accurate control of the position and direction upon sending the LCD panel.

Figure 6:
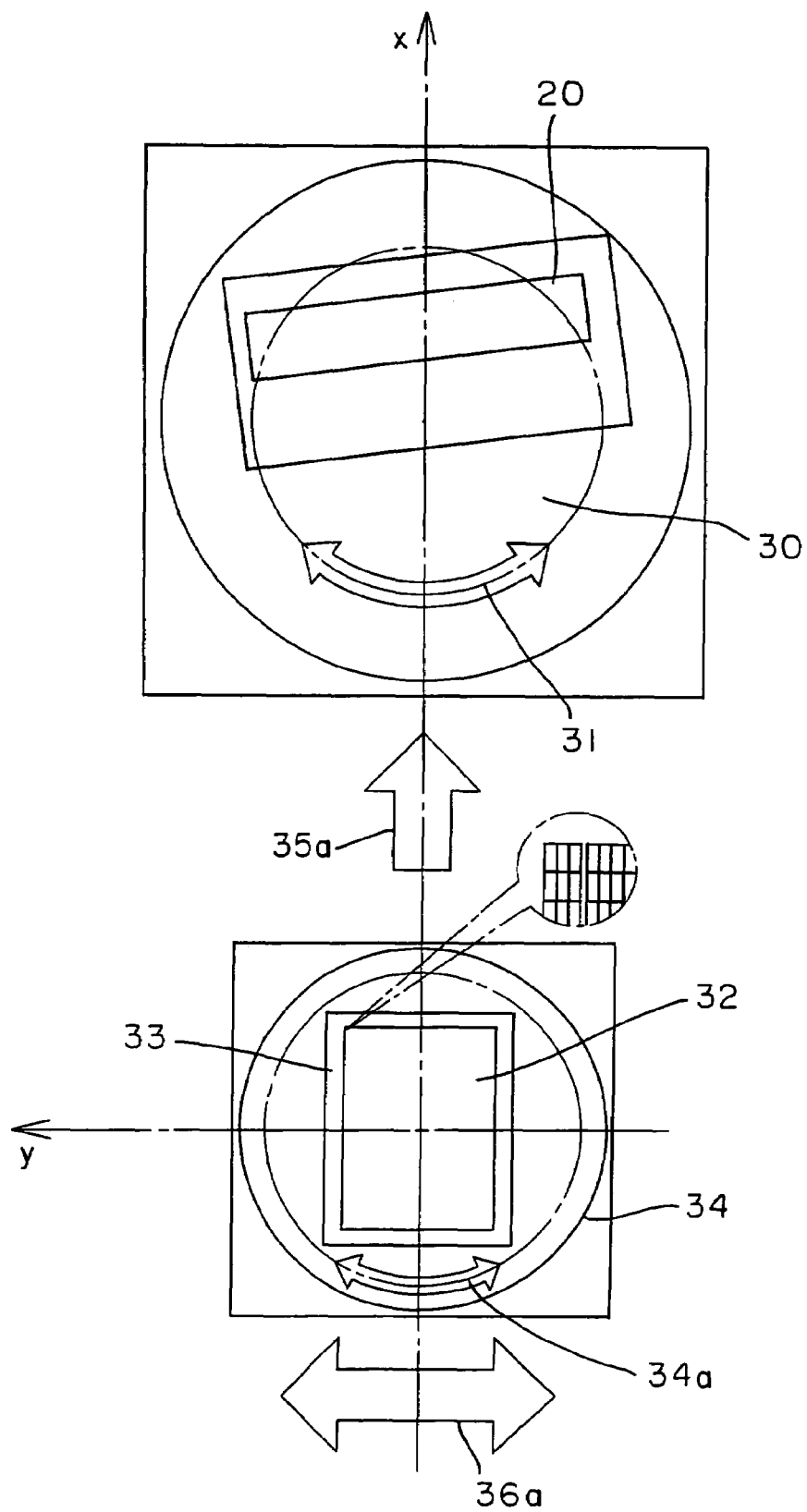
FIG. 6 is a schematic view of a mechanism configured to rotate a LCD panel sample to the accurately oriented position as well as a mechanism configured to bring an inkjet head into a selected one of various inclined positions.
Figure 7:
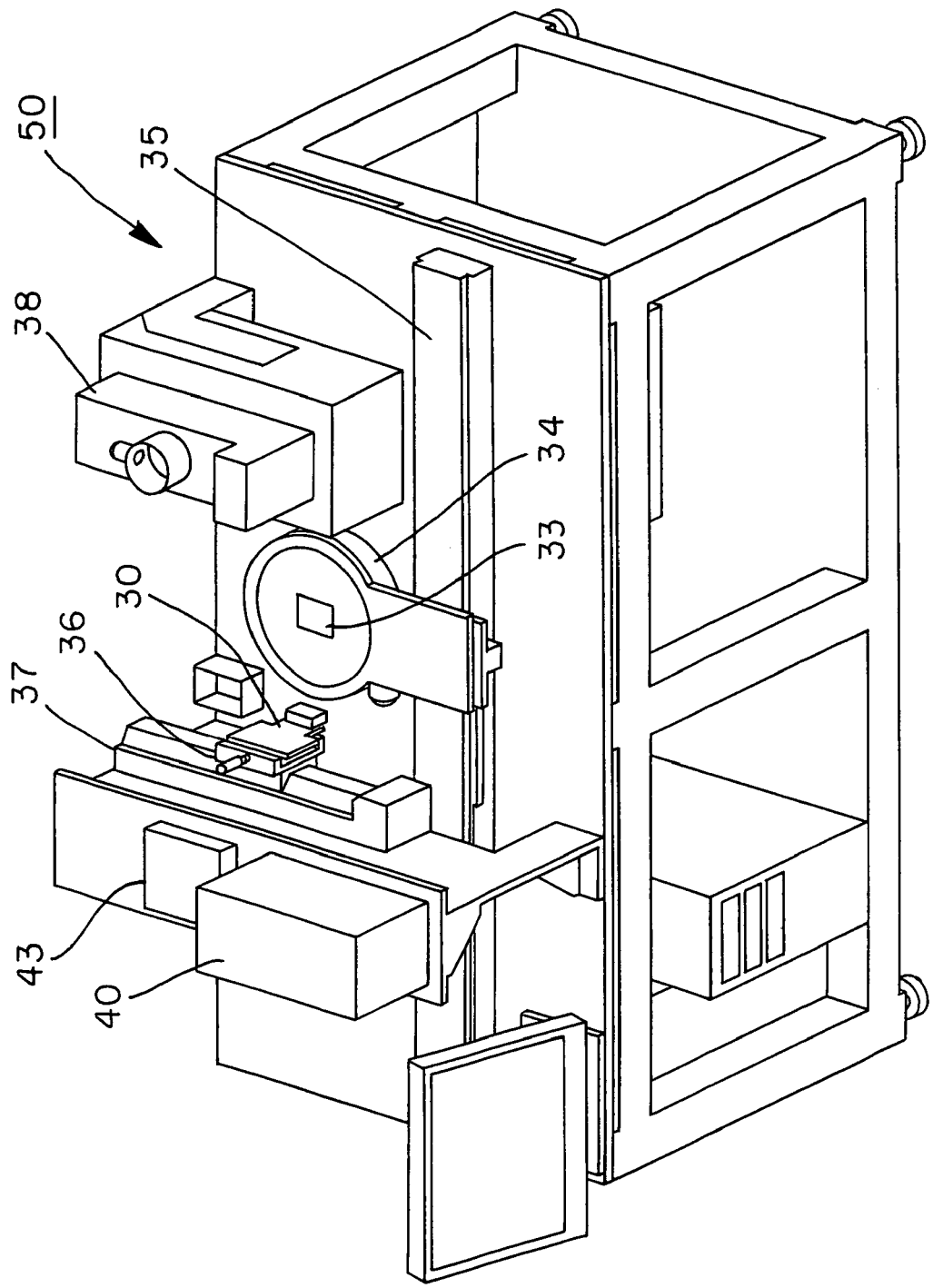
FIG. 7 is a front perspective view of one embodiment of a micro-lens fabrication apparatus according to the present invention.

Referring to FIGS. 6 to 8, a micro-lens fabrication apparatus 50 is explained below. In FIG. 6, an inkjet head module 30 bearing the inkjet head 20 can rotate about an axis parallel to the z-axis in one or the opposite direction as indicated by a two-heads arrow 31 to move the inkjet head 20 in an orbit about the axis to any desired inclined position including the inclined position illustrated in FIG. 5(b). In FIG. 6, the reference numeral 32 indicates an LCD panel supported by a holder 33. Referring also to FIGS. 7 and 8, the holder 33 is fixedly placed on a turn table 34. The turn table 34 can rotate about an axis parallel to the z-axis in one or the opposite directions as indicated by a two-heads arrow 34a to rotate the LCD panel 32 through the determined rotary angle about the axis parallel to the z-axis to the accurately oriented position that is described before in connection with FIGS. 5(b) and 5(c). The inkjet head module 30 is supported by a z-direction lifter 36 (see FIG. 7), which, in turn, is supported by a lateral or y-direction carrier 37. The lateral carrier 37 can move the inkjet module 30 bearing the inkjet head 20 in the y-direction as indicated by a two-heads arrow 36a. The lifter 36 can move the inkjet module 30 in the z-direction to adjust vertical spacing of the nozzles from the LCD panel 32. The turn table 34 bearing the holder 33 and the LCD panel 32 is fixedly supported by a longitudinal or x-direction carrier 35. The longitudinal carrier 35 can move the LCD panel 32 in the x-direction as indicated by an arrow 35a (see FIG. 6).

Referring FIG. 8, the reference numeral 39 indicates a camera. The camera 39 detects the apertures 22a to 22n, see FIG. 5(a), to determine a rotary angle, through which the turn table 34 should turn to rotate the LCD panel 33 to the accurately oriented position. A tank 40 contains resin composition liquid. An inkjet controller 43 selectively energize to open the nozzles of the inkjet head 20 and controls discharge of the resin composition liquid in amount out of the selected nozzle. Referring also to FIG. 7, the micro-lens fabrication apparatus 50 includes a thermo or optical setting unit 38 to cure the resin composition liquid deposits on the polarizer film of the LCD panel 33 by applying heat or a UV light. FIG. 8 shows the control device 42 of the micro-lens fabrication apparatus 50.

The fabrication begins with a step of placing a LCD panel 32 on the holder 33 with a bottom or first face of its polarizer film on (see FIG. 6). The longitudinal carrier 35 moves the LCD panel 22 to a camera position below the camera 39. The image data picked up by the camera 39 with regard to the apertures 22a to 22n (see FIG. 5(c)) is processed by a computer within the control device 42. After recognizing a current position of the LCD panel 32 from the image data picked up by the camera 39, the computer determines a rotary angle between the current position of the LCD panel 32 and the accurately oriented position where the apertures are in alignment with lines extending in the x-direction. Through this determined rotary angle, the turn table 34 rotates to bring the LCD panel 32 to the accurately oriented position. The x-direction carrier 35 moves the LCD panel 32 from the camera position to a start position where the front row of apertures is on a start line extending in the y-direction. The computer receives information on an aperture lateral pitch P2 after image processing the image data or from the specifications of the LCD panel 32. It also receives information on a nozzle pitch P1 of the nozzles of the inkjet head 20, see FIG. 5(a). Based on the aperture lateral pitch P2 and the nozzle pitch P1, the computer calculates a bias angle θ indicative of an inclined position, which the inkjet head 20 should take, and a rotary angle ψ, through which the inkjet module 30 should rotate to move the inkjet head 20 in the orbit to the inclined position. Through the calculated rotary angle ψ, the inkjet modulator 30 rotates to move the inkjet head 20 in the orbit to the inclined position as illustrated in FIG. 5(b). After having placed the inkjet head 20 in the inclined position, the lateral or y-direction carrier 37 moves the inkjet head 20 in the y-direction to bring the nozzles into alignment with columns of apertures as illustrated in FIGS. 5(b) and 5(c). Vertical adjustment of the inkjet head 20 is carried out by the z-direction lifter 36.

The computer receives information on an aperture longitudinal pitch P3 after image processing the image data or from the specifications of the LCD panel 32. Referring to FIG. 5(c), the aperture longitudinal pitch P3 is a pitch of apertures in each of columns. Based on the data including the bias angle θ, the nozzle pitch P1, the number of apertures of the LCD 33, the number of nozzles of the inkjet head 20 and the shape and size of each of the apertures, the computer creates a schedule of timing and amount of discharge. The created schedule is fed to the inkjet controller 43. Under the control of the computer, the longitudinal or x-direction carrier 35 moves the LCD panel 33 in the x-direction and the inkjet controller 43 energize to open the nozzles selectively in accordance with the schedule until all of the positions on the polarizer film above the apertures are covered by hemi-spherical droplets of the resin composition liquid. Finally, the LCD panel 33 is moved back into the thermo or optical setting unit 38. In the embodiment, a UV light is applied to the droplets of the resin composition liquid on the polarizer film to cure the resin composition into micro-lenses.

In the embodiment, a single inkjet head having 316 nozzles was used. The present invention is not limited to this described example. If desired, a plurality of inkjet heads may be used in cooperation to increase the discharge events per unit amount of time. If desired, an apparent nozzle pitch one half as much as the actual nozzle pitch of one inkjet head may be given by arranging another inkjet head behind such that the nozzles of the two inkjet heads are interleaved. This is a good indication that the nozzle pitch may be adjusted by using a plurality of inkjet heads.

The micro-lens fabrication processes and apparatus 50 make it simple to fabricate any desired pattern or micro-lenses at high speed to meet various orders in kind and/or volume.

In the prior art, a lens array of a resin was proposed to scatter light and an inkjet process was proposed to produce such lens array. Examples are found in JP-A6-303017, JP-A2000-180605, JP-A2004-117955, and JP-A2004-240294. The prior art, however, fails to anticipate various aspects of the present invention.

As previously described, a micro-lens array utilizes a surface energy difference to control curvature of each of micro-lenses on the base, and the shape of each of the micro-lenses is such that collimated light substantially orthogonally incident to each of the micro-lens is compressed into a tight beam to enter one of apertures for entry of backlight.

The micro-lens array is advantageously used in a method of letting a sufficient quantity of light pass through each of apertures for entry of backlight to liquid crystal (LC) of a liquid crystal display (LCD) panel. The method comprises:

utilizing an inkjet head to deposit droplets of a liquid resin composition on a transparent base in alignment with the apertures;

constraining a surface energy difference between each of the droplet and the base to a predetermined range:

utilizing the surface energy difference to let the droplets grow into micro-lenses having a shape;

curing the micro-lenses to keep the shape such that collimated light substantially orthogonally incident to each of the micro-lenses is compressed into a tight beam to enter one of the apertures; and exposing the base bearing the micro-lenses to backlight.

In the embodiment, this method is carried out by a system comprising an inkjet head configured to deposit droplets of a liquid resin composition on a transparent base in alignment with the apertures. The system utilizes a surface energy difference constrained to a predetermined range to let the droplets grow into micro-lenses having a shape. An unit, see 38 in FIGS. 7 and 8, use a UV light to cure the micro-lenses to keep the shape such that collimated light substantially orthogonally incident to each of the micro-lenses is compressed into a tight beam to enter one of the apertures.

Referring again to FIGS. 5(b), 5(c), and 6-8, a micro-lens fabrication apparatus, comprises a holder 33 on which the LCD panel 32 is placed with a transparent base, in the form of a polarizer film 103 (see FIG. 1) up. A camera 39 is provided to pick up image of apertures for entry of backlight. A control device 42 processes the picked up image to determine a rotary angle through which the LCD panel 33 should rotate to come to an accurately oriented position in which the columns of the apertures extend in the x direction and provides a control signal indicative of the determined rotary angle. A turn table 34 rotates the holder 33 and the LCD panel 32 through the determined rotary angle to the accurately oriented position in response to the control signal indicative of the determined rotary angle. An inkjet head 20 has a plurality of nozzles. The inkjet head 20 has a home position and various inclined position, see FIGS. 5(b) and 5(c). A tank 40 contains UV-cured liquid resin composition. An inkjet head modulator 30 is operative to bring the inkjet head 20 to a selected one of the various inclined position in which the plurality of nozzles are in alignment with at least some of the columns of the apertures, respectively. A longitudinal or x direction carrier 35 is operative to move the LCD panel 33 in the x direction. An inkjet controller 43 controls discharge of the liquid resin composition via the nozzles to deposit droplets of the liquid resin composition on the transparent base, each in alignment with one of the apertures. The deposited droplets are cured at 38 to make micro-lenses.

The invention being thus described, it will be obvious that the same may be varied in many ways. Such variations are not to be regarded as a departure from the sprit and scope of the invention, and all of such modifications as would be obvious to one skilled in the art are intended to be included within the scope of the following claims.

What is claimed is:

1. A micro-lens array for a liquid crystal display (LCD) panel having apertures for entry of backlight, the micro-lens array comprising:

a transparent base; and micro-lenses of a resin on the base, the base and each of the micro-lenses having a surface energy difference falling in a predetermined range, wherein the shape of each of the micro-lenses is such that collimated light substantially orthogonally incident to each of the micro-lens is compressed into a tight beam to enter one of the apertures.

2. The micro-lens array as claimed in claim 1, wherein the predetermined range is from 5 dyne/cm$^2$ to 20 dyne/cm$^2$.

3. The micro-lens array as claimed in claim 2, wherein the micro-lenses have a height in the z direction not greater than 10 microns and a width in the x and y directions not greater than 150 microns.

4. The micro-lens array as claimed in claim 2, wherein the base has first and second faces, the second face being substantially planar, the first face bearing the micro-lenses thereon, and wherein the shape of the micro-lenses and thickness of the base are such that collimated light substantially orthogonally incident to each of the micro-lenses is focused at a point distant from the second face of the base after having past through the one aperture.

5. The micro-lens array as claimed in claim 1, wherein the base is a polarizer film.

6. The micro-lens array as claimed in claim 1, wherein the base is an optical film.

7. The micro-lens array as claimed in claim 4, wherein the resin has an index of refraction of between 1.30 and 1.70.

8. A method of letting a sufficient quantity of light pass through each of apertures for entry of backlight to liquid crystal (LC) of a liquid crystal display (LCD) panel, the method comprising:
   utilizing an inkjet head to deposit droplets of a liquid resin composition on a transparent base in alignment with the apertures;
   constraining a surface energy difference between each of the droplet and the base to a predetermined range:
   utilizing the surface energy difference to let the droplets grow into micro-lenses having a shape;
   curing the micro-lenses to keep the shape such that collimated light substantially orthogonally incident to each of the micro-lenses is compressed into a tight beam to enter one of the apertures; and
   exposing the base bearing the micro-lenses to backlight.

9. The method as claimed in claim 8, wherein the micro-lenses are arranged in rows and in columns such that the two of the micro-lenses which belong to the adjacent two of the columns belong to the adjacent two of the rows, respectively.

10. The method as claimed in claim 8,
    wherein the apertures are arranged in rows and in columns;
    wherein the inkjet head has a plurality of nozzles, the inkjet head having a home position and various inclined positions;
    wherein the inkjet head is brought to a selected one of the various inclined positions in which the plurality of nozzles are in alignment with the at least some of the columns of the apertures, respectively.

11. The method as claimed in claim 8, wherein, when the base is moving in the x direction, the inkjet head discharges the liquid resin composition to arrange droplets on the base as arranged in rows and in columns such that the two of the droplets which belong to the adjacent two of the columns belong to the adjacent two of the rows, respectively.

12. The method as claimed in claim 8, wherein the predetermined range is from 5 dyne/cm$^2$ to 20 dyne/cm$^2$.

13. The method as claimed in claim 8, wherein the micro-lenses have a height in the z direction not greater than 10 microns and a width in the x and y directions not greater than 150 microns.

14. A system for letting a sufficient quantity of light pass through each of apertures for entry of backlight to liquid crystal (LC) of a liquid crystal display (LCD) panel, the system comprising:
   an inkjet head configured to deposit droplets of a liquid resin composition on a transparent base in alignment with the apertures;
   means for utilizing a surface energy difference constrained to a predetermined range to let the droplets grow into micro-lenses having a shape;
   an unit configured to cure the micro-lenses to keep the shape such that collimated light substantially orthogonally incident to each of the micro-lenses is compressed into a tight beam to enter one of the apertures; and
   means for exposing the base bearing the micro-lenses to backlight.

15. The system as claimed in claim 14, further comprising:
   a turn table bearing a holder on which the LCD panel is placed, the apertures of the LCD panel being arranged in rows and in columns,
   an inkjet head module bearing the inkjet head;
   wherein the turn table turns to rotate the LCD panel to an accurately oriented position in which the columns of the apertures extend in the x direction;
   wherein the inkjet head has a home position and various inclined positions and the inkjet head module rotates to bring the inkjet head to a selected one of the various inclined positions in which the plurality of nozzles are in alignment with the at least some of the columns of the apertures, respectively.

16. The system as claimed in claim 14, wherein, when the base is moving in the x direction, the inkjet head discharges the liquid resin composition to arrange droplets on the base in rows and in columns such that the two of the droplets which belong to the adjacent two of the columns belong to the adjacent two of the rows, respectively.

17. The system as claimed in claim 14, wherein the predetermined range is from 5 dyne/cm$^2$ to 20 dyne/cm$^2$.

18. The system as claimed in claim 14, wherein the micro-lenses have a height in the z direction not greater than 10 microns and a width in the x and y directions not greater than 150 microns.

19. A micro-lens fabrication apparatus, comprising:
   a liquid crystal display (LCD) panel having apertures for entry of backlight and a transparent base, the apertures being arranged in rows and in columns;
   a holder on which the LCD panel is placed with the transparent base up;
   a camera configured to pick up image of the apertures;
   means for processing the picked up image of the apertures to determine a rotary angle through which the LCD panel should rotate to come to an accurately oriented position in which the columns of the apertures extend in the x direction and providing a control signal indicative of the determined rotary angle;
   means for rotating the holder and the LCD panel through the determined rotary angle to the accurately oriented position in response to the control signal indicative of the determined rotary angle;
   an inkjet head having a plurality of nozzles, the inkjet head having a home position and various inclined position;
   a tank containing liquid resin composition;
   means for bringing the inkjet head to a selected one of the various inclined position in which the plurality of nozzles are in alignment with at least some of the columns of the apertures, respectively;
   means for moving the LCD panel in the x direction;
   an inkjet controller configured to control discharge of the liquid resin composition via the nozzles to deposit droplets of the liquid resin composition on the transparent base, each in alignment with one of the apertures; and
   means for curing the deposited droplets to make micro-lenses.

* * * * *